Figure 10:
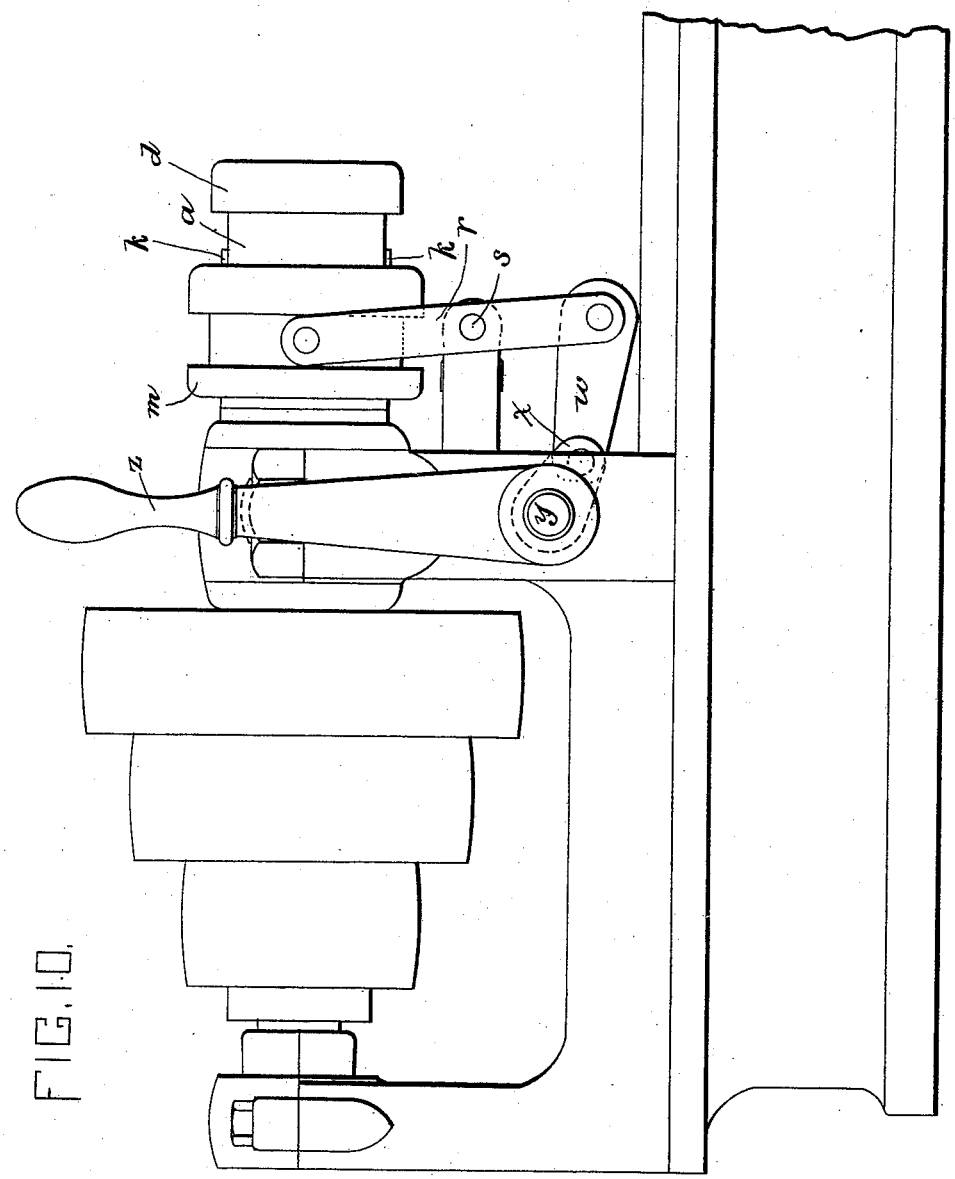

(No Model.) 2 Sheets—Sheet 1.
J. HARTNESS.
CHUCK.
No. 425,224. Patented Apr. 8, 1890.
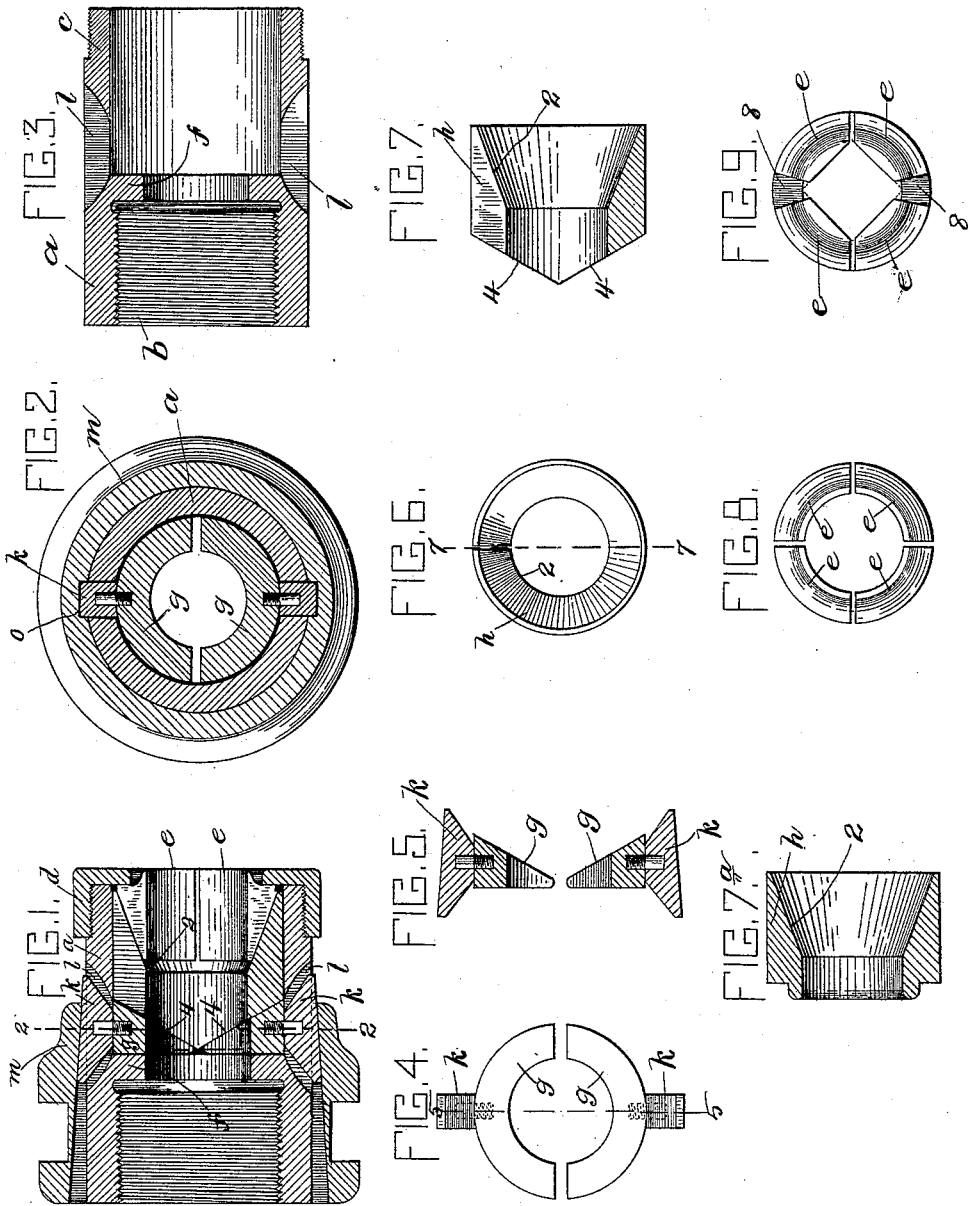
WITNESSES:
INVENTOR:

(No Model.) 2 Sheets—Sheet 2.

J. HARTNESS.
CHUCK.

No. 425,224. Patented Apr. 8, 1890.

WITNESSES:

INVENTOR:

UNITED STATES PATENT OFFICE.

JAMES HARTNESS, OF SPRINGFIELD, VERMONT, ASSIGNOR TO THE JONES & LAMSON MACHINE COMPANY, OF SAME PLACE.

CHUCK.

SPECIFICATION forming part of Letters Patent No. 425,224, dated April 8, 1890.

Application filed December 13, 1889. Serial No. 333,662. (No model.)

*To all whom it may concern:*

Be it known that I, JAMES HARTNESS, of Springfield, in the county of Windsor and State of Vermont, have invented certain new and useful Improvements in Chucks, of which the following is a specification.

This invention has for its object to provide a chuck adapted to firmly grasp and rotate the rod or stock from which screws and analogous articles are made; and it is an improvement on the subject-matter of Letters Patent No. 412,027, granted October 1, 1889, to James Hartness and Elisha F. Spaulding.

The invention consists in the improved means hereinafter described for imparting endwise movement to the internally-tapered or wedge-shaped sleeve in which the chuck-jaws are held, said jaws having inclined backs fitting the tapered internal surface of the sleeve, as in the patent above referred to, and being pressed inwardly upon the stock inserted between them by an endwise movement of said sleeve.

Of the accompanying drawings, forming a part of this specification, Figure 1 represents a longitudinal section of my improved chuck. Fig. 2 represents a section on line 2 2, Fig. 1. Fig. 3 represents a longitudinal section of the shell or body of the chuck. Fig. 4 represents an end view of the segmental wedges and the blocks attached thereto, which, in connection with the external sleeve, hereinafter referred to, move the jaw-holding sleeve endwise. Fig. 5 represents a section on line 5 5, Fig. 4. Fig. 6 represents an end view of the jaw-holding sleeve. Fig. 7 represents a section on line 7 7, Fig. 6. Fig. 7ª represents a modification. Fig. 8 represents an end view of the jaws as formed for holding cylindrical stock. Fig. 9 represents an end view of the jaws formed to hold stock which is square, octagonal, or of other polygonal form in cross-section. Fig. 10 represents a side elevation of the chuck and means for operating its jaws.

The same letters and numerals of reference indicate the same parts in all the figures.

In the drawings, $a$, Fig. 3, represents the shell or body of the chuck, which is of cylindrical form, and has an internal screw-thread $b$ at one end to engage the spindle which rotates the chuck and an external screw-thread $c$ at the other end to engage the internally-threaded flanged collar $d$, which retains the jaws $e$ $e$ in place in the chuck, as shown in Patent No. 412,027, above referred to. Within the shell or body $a$ is an inwardly-projecting flange or shoulder $f$, one side of which forms a seat or bearing for the segmental wedges $g$ $g$, hereinafter referred to.

$h$ represents the sleeve, which contains and operates the jaws $e$ $e$, said sleeve having a tapered or wedge-shaped internal surface 2, which bears on the correspondingly-inclined backs of the jaws, as shown in the above-mentioned patent, the sleeve being movable endwise in the chuck-body $a$, so that when moved in one direction it will press the jaws inwardly upon the stock, which they surround.

$g$ $g$ represent two segmental wedges, which are located within the shell or body $a$ between the flange or shoulder $f$ and the rear end of the jaw-holding sleeve $h$. One side of each wedge is inclined or diagonal to the axis of the chuck and bears against a corresponding incline formed on the rear end of the jaw-holding sleeve, the latter having two inclines 4 4—one for each wedge—as shown in Fig. 7.

To the backs of the wedges $g$ $g$ are affixed blocks $k$ $k$, which extend through slots $l$ $l$, formed in the shell or body $a$ and project outside of said body, their outer sides or backs being inclined, as shown in Figs. 1 and 5.

$m$ represents a sleeve, which is fitted to slide on the exterior of the shell $a$ and has two internal longitudinal grooves $o$ $o$, which receive the blocks $k$, the bottoms of said grooves being inclined to fit the inclinations of the backs of the blocks $k$, as shown in Fig. 2. It will be seen that when the sleeve $m$ is moved in the direction indicated by the arrow marked thereon in Fig. 1 the inclined bottoms of its grooves acting on the block $k$ will force said blocks and the wedges $g$ $g$ inwardly, and thus cause the wedges to force the jaw-holding sleeve $h$ toward the outer end of the chuck sufficiently to press the jaws inwardly and cause them to firmly grasp the stock.

The sleeve $h$ is divided longitudinally, as shown at 6, Fig. 6, so that it is expansible to a slight extent. The pressure of the wedges $g$ $g$ on the oppositely-inclined faces 4 4 on the sleeve giving the sleeve an endwise motion, as above described, causes the sleeve to expand slightly by the contact of its inclined surface 2 with the inclined backs of the jaws. The periphery of the sleeve $h$ is thus firmly pressed against the inner surface of the shell $a$, so that the sleeve and shell are firmly connected and the sleeve cannot slip in the shell while the work is held by the jaws. When the wedges $g$ $g$ are released, the split sleeve $h$ automatically contracts to its normal diameter and becomes loose in the shell, said contraction causing the sleeve to move backward to a sufficient extent to release the jaws. This feature of my invention—viz., the expansible sleeve $h$ and the arrangement of the wedges $g$ $g$ so that they will move the sleeve endwise, thus expanding the sleeve and binding it firmly to the shell and permitting the automatic release of the jaws by the contraction of the sleeve $h$—is an important one, because it insures the firm connection of the jaws to the sleeve when the jaws are grasping the stock, and insures the quick release of the stock when the external sleeve $m$ is moved to release the wedges $g$ $g$.

The sleeve $m$ may be moved upon the shell by any suitable means—for example, a lever or levers $r$, pivoted at $s$ to an ear $t$ on the head-stock $u$, or other suitable part of the screw-machine, and engaged with an annular groove $v$ between two peripheral shoulders on the sleeve $m$, as shown in Fig. 10, said lever being connected at its lower end by a link $w$ with a short arm $x$ on a rock-shaft $y$, which is journaled in bearings in the head-stock $u$, and is provided with a lever $z$, arranged to be grasped by the operator, who is enabled, through said lever, rock-shaft, and intermediate connections, to move the sleeve $m$ in either direction.

The jaws $e$ may be formed with segmental inner surfaces, as shown in Fig. 8, to grasp cylindrical stock, or with angular inner surfaces, as shown in Fig. 9, to grasp stock that is polygonal in cross-section. When the jaws are formed with angular inner faces, as shown in Fig. 9, I prefer to employ two jaws instead of four, which is the preferred number when the jaws are formed as shown in Fig. 8, the angular-faced jaws being provided with recesses 8 8 to receive two of the angles of a rod that is square in cross-section, as indicated by dotted lines in Fig. 9.

I do not limit myself to the described means for pressing the segmental wedges $g$ $g$ inwardly, and may substitute any other suitable device for the grooved sleeve $m$ and block $k$ $k$ for this purpose. The rear end of the sleeve may be made without the inclines 4 4 and formed to have a narrow bearing on the wedges $g$ $g$, as shown in Fig. 7$^a$.

I claim—

1. In a chuck, the combination of the shell or body having an internal shoulder, a sleeve movable endwise in said shell and having a tapered or wedge-shaped inner surface, the jaws within said sleeve, radially-movable wedges interposed between the shoulder in the shell and the rear end of the movable sleeve, and means for forcing said wedges inwardly, and thereby moving the sleeve endwise, as set forth.

2. In a chuck, the combination of the shell or body having an internal shoulder, an internally-tapered or wedge-shaped sleeve movable endwise in said shell and made expansible or elastic, as described, the jaws within said sleeve, radially-movable wedges interposed between the shoulder in the shell and the rear end of the movable sleeve, and means whereby said wedges may be alternately forced inwardly and released, the inward movement of said wedges moving the jaw-containing sleeve endwise and causing its expansion, while the release of the wedges permits the contraction of the sleeve and the automatic release of the jaws, as set forth.

3. In a chuck, the combination of the shell or body having an internal shoulder, the movable internally-tapered or wedge-shaped sleeve $h$ in said casing, having inclines 4 4 on its inner end, the jaws $e$ $e$ in said sleeve, the segmental wedges located between the internal shoulder of the shell and the rear end of the sleeve $h$, and provided with inclined sides fitting the inclines 4 4 of said sleeve, and means for pressing said wedges inwardly, and thereby moving the sleeve $h$ endwise, as set forth.

4. In a chuck, the combination of the shell or body, the internally-tapered or wedge-shaped sleeve $h$, movable in said shell, the radially-movable wedges in the shell, bearing against the rear end of the sleeve $h$, the blocks $k$, attached to said wedges and projecting outwardly through slots in the shell, and the longitudinally-movable external sleeve formed internally to act on the blocks and force the latter and the wedges inwardly, as set forth.

5. In a chuck, the combination of the shell or body, the internally-tapered or wedge-shaped sleeve $h$, movable in said shell, the radially-movable wedges in the shell, bearing against the rear end of the sleeve $h$, the blocks $k$, attached to said wedges and projecting outwardly through slots in the shell, said blocks having inclined backs, the external sleeve having longitudinal inclined grooves receiving said blocks, and means for moving said external sleeve, as set forth.

In testimony whereof I have signed my name to this specification, in the presence of two subscribing witnesses, this 29th day of November, A. D. 1889.

JAMES HARTNESS.

Witnesses:
MERRILL L. LAWRENCE,
ALICE M. WHEELER.